(12) United States Patent
Omori et al.

(10) Patent No.: US 7,663,999 B2
(45) Date of Patent: Feb. 16, 2010

(54) DISC DRIVE APPARATUS AND ELECTRONIC APPLIANCE

(75) Inventors: Kiyoshi Omori, Tokyo (JP); Takashi Ootsuka, Kanagawa (JP); Kunitaka Nerome, Kanagawa (JP); Hiroyuki Fukuchi, Kanagawa (JP); Manabu Yoshii, Kanagawa (JP); Koji Natsubori, Chiba (JP); Yoko Maruyama, Tokyo (JP); Tatsuya Isoda, Tokyo (JP); Tsuyoshi Abiko, Saitama (JP)

(73) Assignee: Sony Corporation, Tokyo (JP)

( * ) Notice: Subject to any disclaimer, the term of this patent is extended or adjusted under 35 U.S.C. 154(b) by 688 days.

(21) Appl. No.: 11/039,864

(22) Filed: Jan. 24, 2005

(65) Prior Publication Data

US 2005/0210492 A1 Sep. 22, 2005

(30) Foreign Application Priority Data

Feb. 4, 2004 (JP) ............................ P2004-028630
Apr. 5, 2004 (JP) ............................ P2004-111447

(51) Int. Cl.
*G11B 33/02* (2006.01)
*G11B 17/03* (2006.01)

(52) U.S. Cl. .................... 369/75.11; 720/655

(58) Field of Classification Search ............. 369/75.11; 720/725, 600, 645, 646, 647, 648, 650, 652, 720/653, 655

See application file for complete search history.

(56) References Cited

U.S. PATENT DOCUMENTS

| | | | | |
|---|---|---|---|---|
| 5,583,840 | A | * | 12/1996 | Minemura et al. .......... 369/100 |
| 5,802,022 | A | * | 9/1998 | Kim et al. ................ 369/31.01 |
| 6,178,059 | B1 | * | 1/2001 | Frees .......................... 360/75 |
| 6,798,600 | B2 | * | 9/2004 | Yoshimura ................... 360/69 |

OTHER PUBLICATIONS

U.S. Appl. No. 11/061,621, filed Feb. 22, 2005, Omori, et al.
U.S. Appl. No. 11/068,227, filed Mar. 1, 2005, Omori, et al.

* cited by examiner

*Primary Examiner*—Joseph H Feild
*Assistant Examiner*—Parul Gupta
(74) *Attorney, Agent, or Firm*—Oblon, Spivak, McClelland, Maier & Neustadt, L.L.P.

(57) ABSTRACT

A disc drive apparatus is adapted to be driven when incorporated into a host appliance provided with a see-through section and comprises a disc receiving section for receiving a disc-shaped recording medium, a disc rotary drive mechanism for driving the disc-shaped recording medium to rotate, a recording and/or reproduction mechanism for recording information signals on and/or reproducing information signals from the disc-shaped recording medium and an apparatus main body arranged in correspondence to the see-through section formed in the host appliance and provided with a see-through hole exposing part of the disc-shaped recording medium placed on the disc receiving section to the outside of the host appliance by way of the see-through section.

6 Claims, 6 Drawing Sheets

DISC DRIVE APPARATUS AND ELECTRONIC APPLIANCE

BACKGROUND OF THE INVENTION

1. Field of the Invention

This invention relates to a disc drive apparatus for recording information signals on and/or reproducing information signals from a disc-shaped recording medium. More particularly, the present invention relates to a disc drive apparatus to be incorporated in the outer cabinet of a host appliance such as a personal computer, a DVD recorder or a game appliance so as to be used integrally with the host appliance and also to an electronic appliance incorporating such a disc drive apparatus.

This application claims priority of Japanese Patent Application No. 2004-028630, filed on Feb. 4, 2004, and Japanese Patent Application No. 2004-111447, filed on Apr. 5, 2004, the entireties of which are incorporated by reference herein.

2. Description of Related Art

Thin disc drive apparatus mounted in a drive bay of the outer cabinet of a host appliance such as a note type or desk-top type personal computer have been and being used for recording information signals on and/or reproducing information signals from an optical disc such as a CD (compact disc) or a DVD (digital versatile disc). Such a disc drive apparatus has an apparatus main body that is formed by a pair of halves including an upper half and a lower half so as to show dimensions that correspond to the size of the standardized drive bay and integrated with the host appliance as it is incorporated into the drive bay of the host appliance. The disc drive apparatus is driven to operate as drive power is supplied from the host appliance (see, inter alia, Patent Document 1: Japanese Patent No. 3280321).

Such a disc drive apparatus is typically provided with a receiving section for receiving a disc-shaped recording medium and a disc tray movable between the inside and the outside of the apparatus main body so as to removably receive a disc-shaped recording medium in a limited space and transfer it to a recording position and/or a reproducing position. The disc tray is provided with a base unit as integral part thereof, which base unit includes a disc rotary drive mechanism for chucking a disc-shaped recording medium placed on the receiving section and driving the recording medium to rotate and an optical pickup mechanism for recording information signals on and/or reproducing information signals from the disc-shaped recording medium.

A disc-shaped recording medium is caught by the disc rotary drive mechanism as it is placed on the receiving section of the disc tray that is drawn out from the apparatus main body and then stored in the disc drive apparatus as the disc tray is pushed into the apparatus main body. Subsequently, the optical pickup mechanism reads information signals from the disc-shaped recording medium, which information signals are then output to the host appliance, or records the information signals supplied from the host appliance.

However, with the above described known disc drive apparatus, once the disc-shaped recording medium is contained in the apparatus main body, it is not possible to see and confirm the type of the disc-shaped recording medium received in the apparatus main body unless the disc tray is drawn out. From the user's viewpoint, he or she often turns off the main power switch of the host appliance after placing the disc-shaped recording medium in the disc drive apparatus. Then, if the user wants to see and confirm that the disc-shaped recording medium placed in the apparatus main body is really the one he or she wants to use, the user has to turn on the main power switch of the host appliance once again and draw out the disc tray.

Once the main power switch is turned on, some host appliances may consume considerable power and time before the main power switch is turned off. Therefore, it will be very convenient to the user if he or she can make sure that a disc-shaped recording medium is contained in the disc drive apparatus and, if it is, identify the disc-shaped recording medium contained in the disc drive apparatus from the outside of the host appliance.

SUMMARY OF THE INVENTION

In view of the above identified circumstances, it is therefore an object of the present invention to provide a disc drive apparatus that allows the user to see if a disc-shaped recording medium is contained in the disc drive apparatus and/or identify the disc-shaped recording medium contained in the disc drive apparatus without turning on the main power switch of the host appliance and an electronic appliance incorporating such a disc drive apparatus.

In an aspect of the present invention, the above object is achieved by providing a disc drive apparatus adapted to be driven when incorporated into a host appliance provided with a see-through section, the disc drive apparatus comprising: a disc receiving section for receiving a disc-shaped recording medium; a disc rotary drive mechanism for driving the disc-shaped recording medium to rotate; a recording and/or reproduction mechanism for recording information signals on and/or reproducing information signals from the disc-shaped recording medium; and an apparatus main body arranged in correspondence to the see-through section formed in the host appliance and provided with a see-through hole exposing part of the disc-shaped recording medium placed on the disc receiving section to the outside of the host appliance by way of the see-through section.

In another aspect of the present invention, there is provided an electronic appliance incorporating a disc drive apparatus and adapted to be used integrally with the disc drive apparatus, the electronic appliance comprising: a containing section containing the disc drive apparatus; an appliance main body having a see-through section for exposing the containing section to the outside; a disc receiving section for receiving a disc-shaped recording medium; a disc rotary drive mechanism for driving the disc-shaped recording medium to rotate; a recording and/or reproduction mechanism for recording information signals on and/or reproducing information signals from the disc-shaped recording medium; and an apparatus main body arranged in correspondence to the see-through section formed in the appliance main body and provided with a see-through hole exposing part of the disc-shaped recording medium placed on the disc receiving section to the outside of the appliance main body by way of the see-through section.

With a disc drive apparatus and an electronic appliance according to the invention, as the disc drive apparatus is mounted in the host appliance, the see-through hole formed in the apparatus main body is located right below the see-through section formed in the host appliance. As a result, the user of the disc drive apparatus can see from the outside if a disc-shaped recording medium is contained in the apparatus main body or not and/or identify the disc-shaped recording medium contained in the apparatus main body through the see-through section of the host appliance and the see-through hole formed in the apparatus main body. Thus, with a disc drive apparatus according to the invention, it is not necessary for the user to turn on the main power switch of the host appliance and eject the disc receiving section to the outside of the host appliance in order to identify the disc-shaped recording medium contained in the apparatus main body.

Once the main power switch is turned on, some host appliances may consume considerable power and time before the main power switch is turned off. Therefore, it is very convenient to the user of a disc drive apparatus according to the invention because he or she can make sure that a disc-shaped recording medium is contained in the disc drive apparatus and, if it is, identify the disc-shaped recording medium contained in the disc drive apparatus without turning on the main power switch of the host appliance.

DETAILED DESCRIPTION OF THE PREFERRED EMBODIMENTS

Now, a disc drive apparatus and an electronic appliance according to the invention will be described in greater detail by referring to the accompanying drawings.

Figure 1:
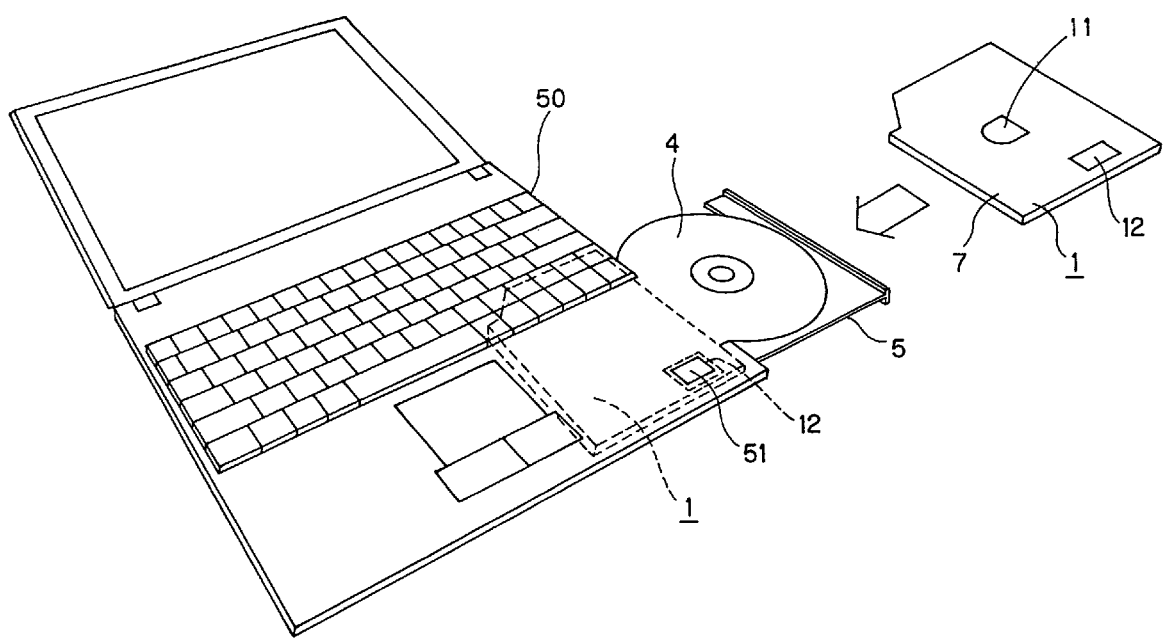
FIG. 1 is a schematic perspective view of a host appliance mounted by an embodiment of disc drive apparatus according to the invention.

It is assumed here that a host appliance mounted by a disc drive apparatus 1 according to the invention is a note type personal computer 50. As shown in FIG. 1, the note type personal computer 50 is provided by a drive bay for receiving a disc drive apparatus 1. Additionally, the note type personal computer 50 is provided with a see-through hole 51 that corresponds to the later-mentioned see-through hole formed in the disc drive apparatus 1 that is mounted in the drive bay.

The see-through hole 51 has a substantially rectangular aperture, which can be protected by a cover made of a light-transmitting material such as resin or glass. When the disc drive apparatus 1 is mounted in the drive bay, the see-through hole 51 is located at a position vis-à-vis the corresponding see-through hole formed in an apparatus main body 7 of the disc drive apparatus 1 to make it possible to identify an optical disc 4 contained in the apparatus main body 7.

Figure 2:
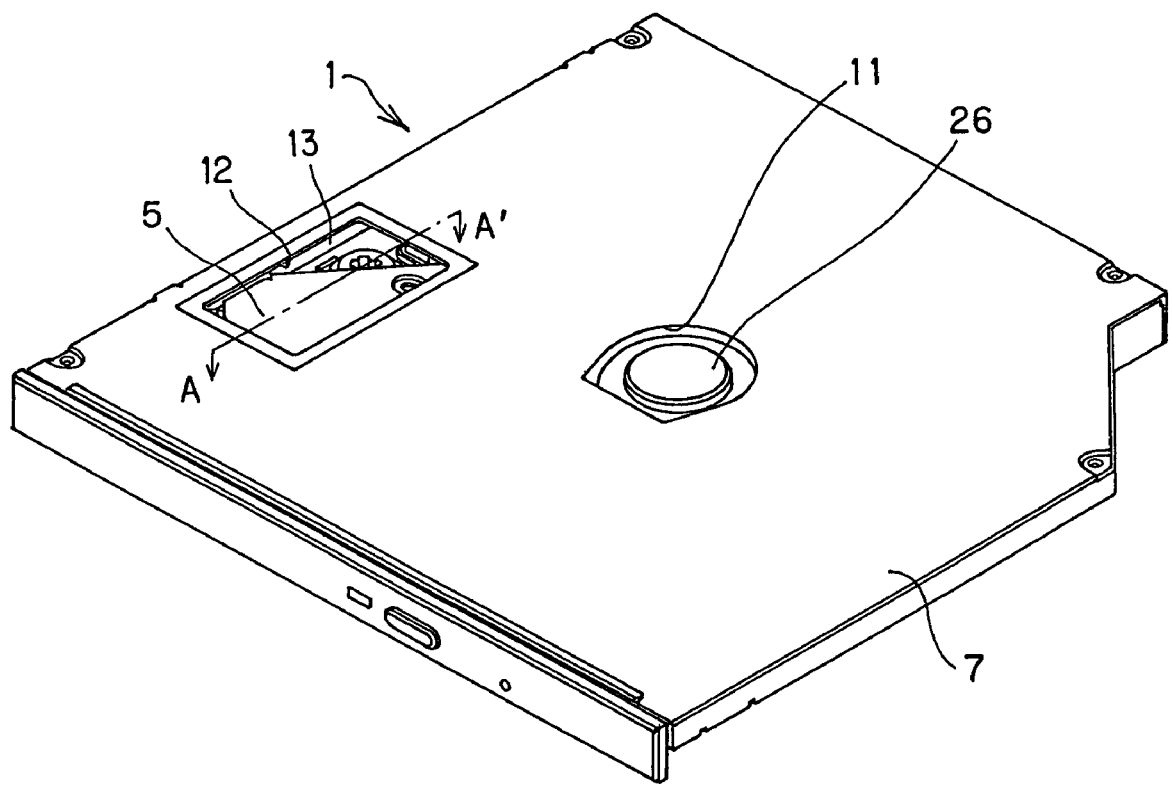
FIG. 2 is a schematic perspective view of the embodiment of disc drive apparatus of FIG. 1.
Figure 3:
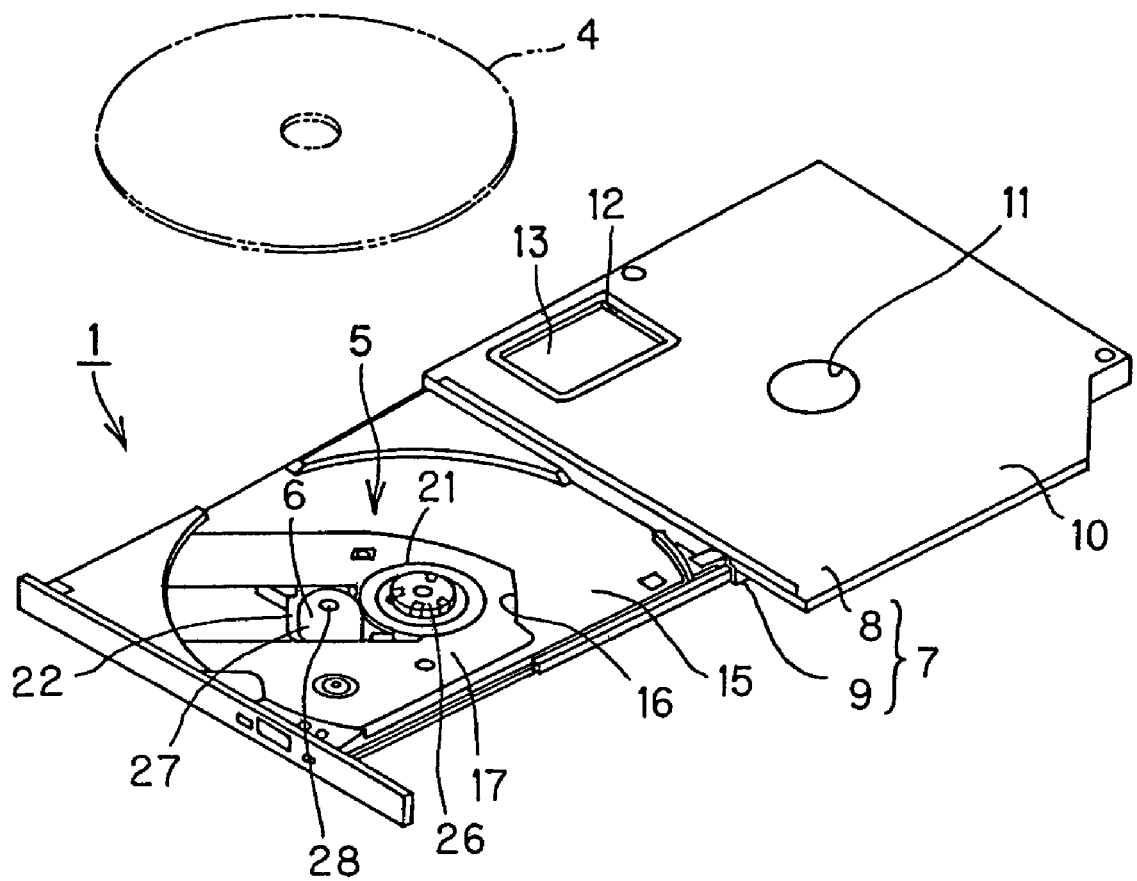
FIG. 3 is a schematic perspective view of the embodiment of disc drive apparatus of FIG. 1 from which the disc tray is drawn out.

The disc drive apparatus 1 to be mounted in the drive bay of the note type personal computer 50 is adapted to drive an optical disc such as a CD (compact disc) or a DVD (digital versatile disc) for the purpose of recording and/or reproducing information signals. As shown in FIGS. 2 and 3, the disc drive apparatus 1 comprises a substantially rectangular apparatus main body 7, which apparatus main body 7 has in the inside thereof a disc tray 5 for receiving an optical disc 4 and an optical pickup unit 6 integrally connected to the disc tray 5 and adapted to rotatably hold the optical disc 4 and reproduce information signals from the optical disc 4.

Figure 4:
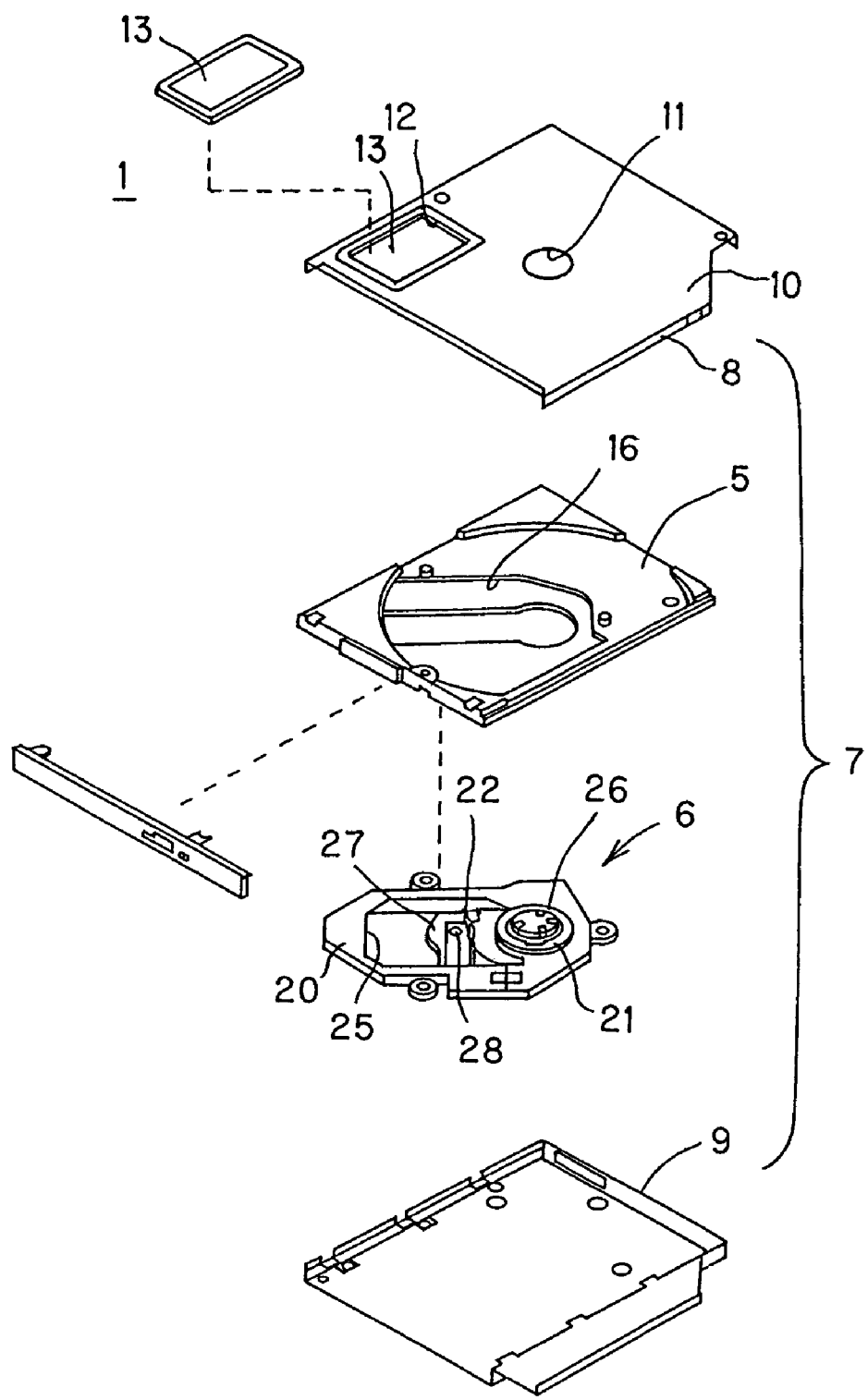
FIG. 4 is an exploded schematic perspective view of the embodiment of disc drive apparatus of FIG. 1.

As shown in FIG. 4, the apparatus main body 7 of the disc drive apparatus 1 is formed by putting a pair of an upper half 8 and a lower half 9 together. The upper and lower halves 8, 9 are typically formed from a metal plate by blanking and subjected to a punching process to produce holes.

The lower half 9 of the apparatus main body 7 is open at the side by way of which the disc tray 5 is pulled out from the apparatus main body 7 and a rear side wall is formed at the side opposite to the open side. A pair of standing lateral walls is formed between the open side and the rear wall side along the lateral edges.

The oppositely disposed lateral walls are provided with guide rails (not shown) for guiding the operation of drawing out the disc tray 5 from the apparatus main body 7 and putting the disc tray 5 into the apparatus main body 7. The guide rails extend between the rear wall side and the open side and have a substantially U-shaped cross section with the recesses of the U-shapes facing the apparatus main body 7. The guide rails are engaged with the respective lateral sides of the disc tray 5 at the recesses thereof so as allow the disc tray 5 to slide freely and guide the disc tray to move from the inside to the outside of the apparatus main body 7 and vice versa.

The upper half 8 is combined with the lower half 9 to form the apparatus main body 7. It has a top plate section 10 that forms the top surface of the apparatus main body 7. Like the above described lower half 9, the upper half 8 is open at the side by way of which the disc tray 5 is pulled out from the apparatus main body 7 and a rear side wall is formed at the side opposite to the open side. A par of standing lateral walls is formed between the open side and the rear wall side along the lateral edges. The top plate section 10 of the upper half 8 is provided substantially at the center thereof with an aperture 11 that is to be placed vis-à-vis the top surface of the disc table of the disc rotary drive mechanism arranged in the optical pickup unit 6, which will be described in greater detail hereinafter.

The top plate section 10 is also provided with a see-through hole 12 at a position corresponding to the see-through hole 51 formed in the above described note type personal computer 50. The see-through hole 12 has a substantially rectangular aperture, which can be protected by a cover 13 made of a light-transmitting material such as resin or glass. When the disc drive apparatus 1 is mounted in the drive bay of the note type personal computer 50, the see-through hole 12 is located at a position right below the corresponding see-through hole 51 formed in the note type personal computer 50. Thus, the user can see if an optical disc 4 is contained in the apparatus main body 7 or not and, if it is, identify the optical disc 4 contained in the apparatus main body 7 by way of the see-through hole 51 of the note type personal computer 50 and the see-through hole 12 cut through the top plate section 10 of the upper half 8 of the apparatus main body 7 of the disc drive apparatus 1.

Figure 5:
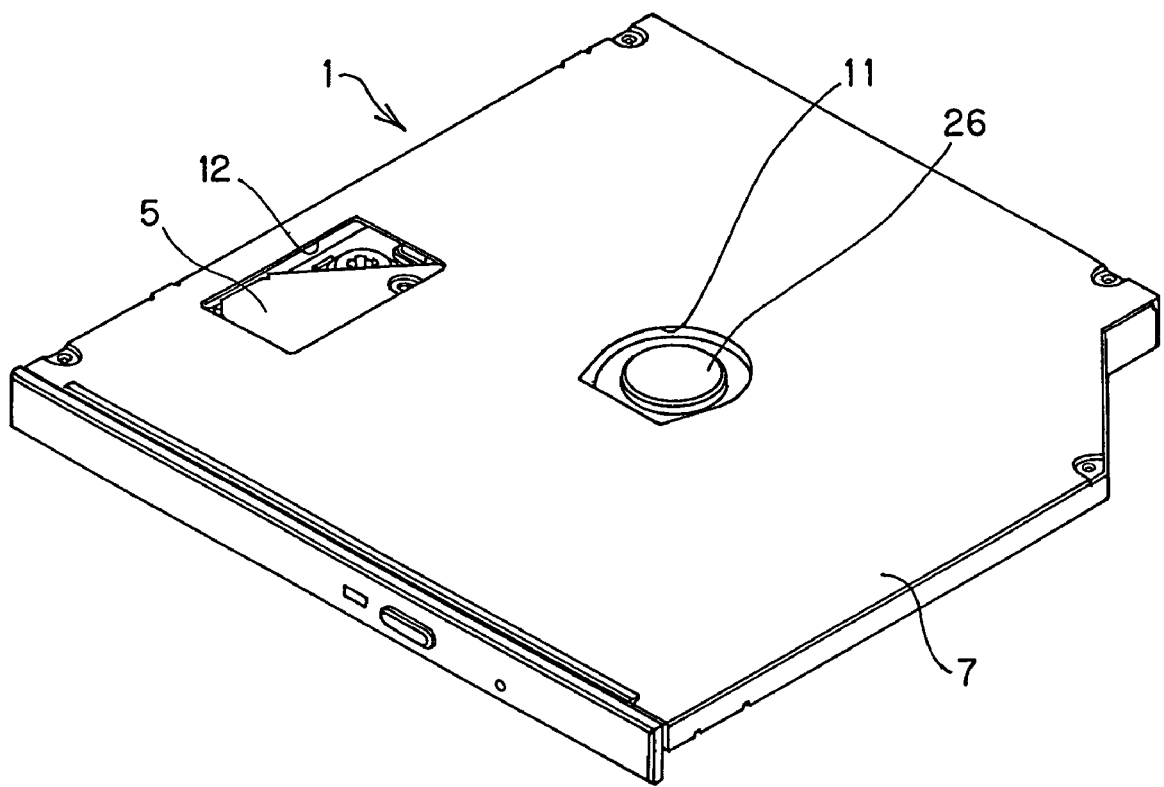
FIG. 5 is a schematic perspective view of another embodiment of disc drive apparatus according to the invention.

As shown in FIG. 5, the see-through hole 12 of the disc drive apparatus 1 may not be provided with a cover for protecting the see-through hole 12. Since the disc drive apparatus 1 is mounted in the drive bay of the note type personal computer 50 and so as to be used integrally with the note type personal computer 50, the user does not touch the see-through hole 12. Therefore, there arises no problem if the see-through hole 12 is not protected by a cover.

The disc tray 5 that is removably put into the apparatus main body 7 has a disc receiving section 15 for receiving an optical disc 4. The disc receiving section 15 has a substantially circular recess whose main surface has an aperture 16 for exposing the disc table and the objective lens of the optical pickup unit 6 contained in the disc tray 5 to the optical disc 4. The aperture 16 is adapted to expose a disc receiving table 17 fitted to the base chassis of the optical pickup unit 6 and a disc table 26 and an objective lens 28 that are also fitted to the base chassis so as to face upward by way of the disc receiving table 17 to the optical disc 4.

The disc tray 5 carries on the rear surface thereof the optical pickup unit 6 and a holding mechanism for engaging the disc tray 5 with and holding it to the apparatus main body 7, although the holding mechanism will not be described in greater detail. Thus, as shown in FIG. 3, the optical pickup unit 6 is moved with the disc tray 5 from the inside to the outside of the apparatus main body 7 and vice versa.

The optical pickup unit 6 arranged on the rear surface of the disc tray 5 has a base chassis 20 that operates as unit main body, a disc rotary drive mechanism 21 integrally formed with the base chassis 20 and rotatably holding the optical disc 4 and an optical pickup mechanism 22 for recording information signals to or reproducing information signals from the optical disc 4 that is held to the disc rotary drive mechanism 21.

The base chassis 20 has a substantially rectangular profile and provided with an aperture 25 for exposing the objective lens 28 of the optical pickup mechanism 22 to the signal recording surface of the optical disc 4. Although not shown, the base chassis 20 is provided with a pickup moving mechanism for moving the pickup base 27 of the optical pickup mechanism 22 in a radial direction of the optical disc 4 and a pair of guide shafts for guiding the movement of the pickup base 27. The aperture 25 has a substantially arc-shaped notch section at a longitudinal end thereof for receiving the disc table of the disc rotary drive mechanism 21 for holding the optical disc 4.

The disc rotary drive mechanism 21 for driving the optical disc 4 to rotate includes a spindle motor (not shown) for driving the optical disc to rotate and a disc table 26 arranged on the spindle shaft of the spindle motor to receive the optical disc 4. The disc rotary drive mechanism 21 is adapted to drive the optical disc 4 to rotate at the CLV (constant linear velocity), the CAV (constant angular velocity) or the velocity of combining the CLV and CAV.

The optical pickup mechanism 22 for recording information signals on or reproducing information signals from the optical disc 4 placed on the disc table has a pickup base 27 that is a substantially rectangular cabinet, which pickup base 27 is provided at least with a light source (not shown) such as a semiconductor laser, an objective lens 28 for converging the light beam emitted from the light source onto and irradiating the signal recording surface of the optical disc 4, a photodetector (not shown) for detecting return light reflected by the recording surface of the optical disc 4 and a drive system for driving the objective lens 28 in the focusing direction and the tracking direction of the optical disc 4.

As the pickup base 27 of the optical pickup mechanism 22 is supported by the a pair of guide shaft arranged at the opposite lateral edges of the aperture 25 of the base chassis 20, the optical disc 4 is guide to move from the inside to the outside of the apparatus main body and, at the same time, the objective lens 28 is located vis-à-vis the signal recording surface of the optical disc 4 by way of the aperture 25.

Referring now to FIG. 1, as the disc drive apparatus 1 having the above described configuration is mounted in the drive bay of the host appliance, or the note type personal computer 50, the see-through hole 51 formed in the note type personal computer 50 is located right below the see-through hole 12 formed at the top surface of the apparatus main body 7. As a result, the user can see if an optical disc 4 is contained in the apparatus main body 7 or not and, if it is, identify the optical disc 4 contained in the apparatus main body 7 by way of the see-through hole 51 of the note type personal computer 50 and the see-through hole 12 cut through the top plate section 10 of the upper half 8 of the apparatus main body 7 of the disc drive apparatus 1. Thus, with a disc drive apparatus 1 according to the present invention, it is not necessary for the user to turn on the main power switch of the note type personal computer 50 and eject the disc tray 5 in order to identify the optical disc 4 contained in the disc drive apparatus 1.

Once the main power switch is turned on, some host appliances such as note type personal computers 50 may consume considerable power and time before the main power switch is turned off. Therefore, it is very convenient to the user of a disc drive apparatus 1 according to the invention because he or she can make sure that an optical disc 4 is contained in the disc drive apparatus 1 and, if it is, identify the optical disc 4 contained in the disc drive apparatus 1 without turning on the main power switch of the note type personal computer 50.

Now, another embodiment of disc drive apparatus according to the invention will be described below. In the following description, the components that are the same as those of the above described disc drive apparatus 1 are denoted respectively by the same reference symbols and will not be described any further.

A disc drive apparatus according to the invention may comprise a transparent cover 30 for protecting the see-through hole 12 and having a protruding section 31 that is adapted to be put into the see-through hole 12 until the cover 30 becomes substantially flush with the inner surface of the top plate section 10 of the upper half 8 where the see-through hole 12 is formed.

Figure 6:
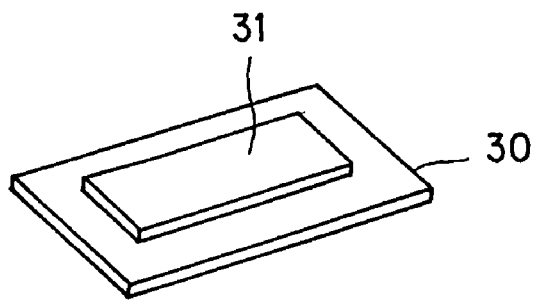
FIG. 6 is a schematic perspective view of a cover having a protruding section and adapted to be used with the embodiment of disc drive apparatus of FIG. 5.
Figure 7:
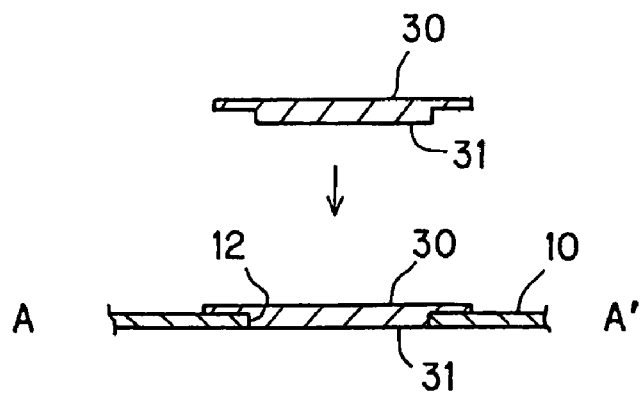
FIG. 7 is a schematic cross sectional view of the cover having a protruding section, showing how it is used to cover the see-through hole of the embodiment of FIG. 5.

As shown in FIG. 6, the cover 30 is made of a light-transmitting material such as resin or glass as in the case of the above described cover 13. The cover 30 is provided at the side thereof to be located in the inside of the apparatus main body 7 with the protruding section 31 that is to be put into the aperture of the see-through hole 12. FIG. 7 is a schematic cross sectional view of the see-through hole 12 taken along line A-A' in FIG. 2. The protruding section 31 has a size substantially same as that of the aperture of the see-through hole 12 so that, as it is put into the see-through hole 12, the cover 30 becomes substantially flush with the inner surface of the top plate section 10 where the see-through hole 12 is formed as shown in FIG. 7. As a result, the disc drive apparatus 1 is protected against dust that otherwise may come into the gap between the outer periphery of the see-through hole 12 and the cover.

Figure 8:
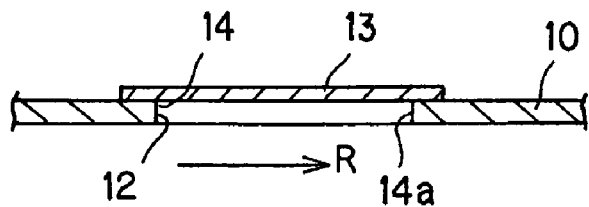
FIG. 8 is a schematic cross sectional view of part of the embodiment of disc drive apparatus of FIG. 6, showing the see-through hole and the cover thereof.

In other words, since the above described cover 13 is not provided with a protruding section, a step 14 is formed between the outer periphery of the see-through hole 12 and the cover 13 when the cover 13 is bonded to cover the see-through hole 12 as shown in FIG. 8. Then, as the optical disc 4 is driven to rotate, dust can adhere to the step 14a located downstream in the direction of R which is the rotary direction of the optical disc 4 as shown in FIG. 8 due to the air flow generated as a result of the rotation of the optical disc 4. Then, the dust adheres to the optical pickup unit 6 arranged in the disc tray 5 to give rise to a hazard to the operation of the disc drive apparatus 1.

On the other hand, when the disc drive apparatus 1 is provided with the cover 30, the protruding section 31 of the cover 30 is put into the aperture of the see-through hole 12 until it becomes substantially flush with the top plate section 10 to consequently prevent dust from adhering and depositing in the gap between the outer periphery of the see-through hole 12 and the cover.

Figure 9:
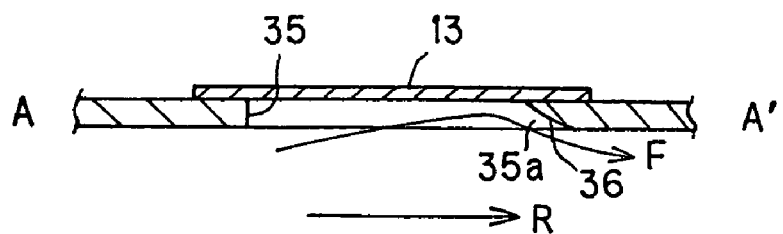
FIG. 9 is a schematic cross sectional view of part of still another embodiment of disc drive apparatus according to the invention and provided with a see-through hole having a slope.

A disc drive apparatus according to the invention may be provided with a slope on the outer periphery of the see-through hole to prevent dust from adhering. FIG. 9 is a schematic cross sectional view of such a see-through hole 35 taken along the line A-A' in FIG. 2. As seen from FIG. 9, the see-through hole 35 is provided with a sloped surface 36 that increases the diameter of the see-through hole 35 toward the inner surface side from the outer surface side that is arranged at least on an outer peripheral section 35a located downstream in the direction of R in FIG. 9 which is the rotary direction of the optical disc 4. In other words, the see-through hole 35 is chamfered in such a way that the sloped surface 36 that is formed toward the inner surface side from the outer surface side approaches to the inside of the apparatus main body 7.

Thus, since the disc drive apparatus is provided with a sloped surface 36 on the outer peripheral section 35a located downstream in the rotary direction of the optical disc 4, dust does neither adhere nor deposit on the outer peripheral section of the see-through hole 35 because it is driven to flow along the sloped surface 36 with flowing air in the direction of F in FIG. 9 if it is produced by the air flow that is by turn given rise to by the rotary movement of the optical disc 4.

While the sloped surface 36 has to be formed at least on the outer peripheral section 35a of the see-through hole 35 located downstream in the rotary direction of the optical disc 4, such a sloped surface 36 may additionally be formed on some other outer peripheral section or sections such as an outer peripheral section located upstream in the rotary direction of the output disc 4 and/or an outer peripheral section located at the side perpendicular to that outer peripheral section. With such an arrangement, air flows further smoothly in the see-through hole 35 so that it is possible to effectively prevent dust from adhering to and depositing on the outer peripheral section or sections of the see-through hole 35.

The transparent covers 13, 30 for covering respectively the above described see-through holes 12, 35 of a disc drive apparatus according to the invention may be made of an anti-static-electricity material. If the covers 13, 30 are made of an anti-static-electricity material, it is possible to prevent dust from adhering and depositing when the covers 13, 30 are electrified. For the purpose of the present invention, for example, HA-55 (tradename, available from Higashiyama Film Co. Ltd.) may be used as anti-static-electricity material.

The covers 13, 30 may be formed by applying an anti-static-electricity material to light transmitting resin or glass for the purpose of preventing electrification of the covers and adhesion/deposition of dust.

A disc drive apparatus according to the invention may be of the slot-in type adapted to allow an optical disc to be directly inserted into and ejected from the apparatus main body 7 through a disc insertion/release slot in stead of the above described type adapted to move an optical disc 4 by means of a disc tray 5 that can be moved from the inside to the outside of the apparatus main body 7.

What is claimed is:

1. A disc drive apparatus incorporated into a host appliance provided with a first see-through section, the disc drive apparatus comprising:
   an apparatus main body provided in the host appliance;
   a disc receiving section configured to receive a disc-shaped recording medium;
   a disc rotary drive mechanism configured to drive the disc-shaped recording medium to rotate;
   a recording and/or reproduction mechanism configured to record information signals on and/or reproduce information signals from the disc-shaped recording medium; and
   a disc tray provided in the apparatus main body, the disc tray containing the disc receiving section, the disc rotary drive, and the recording and/or reproduction mechanism, the disc tray being movable between an inside and an outside of the apparatus main body, wherein
   the apparatus main body is arranged in correspondence to the first see-through section formed in the host appliance and is provided with a second see-through section exposing part of the disc-shaped recording medium placed on the disc receiving section to an outside of the host appliance by way of the first see-through section when the disc tray is positioned in the inside of the apparatus main body.

2. The disc drive apparatus according to claim 1, wherein the second see-through section has a sloped surface formed at least in an outer peripheral section thereof located downstream in a rotary direction of the disc-shaped recording medium exposed to an inner surface side from an outer surface side of the apparatus main body.

3. The disc drive apparatus according to claim 1, wherein a cover is provided with an anti-static-electricity material.

4. An electronic appliance incorporating a disc drive apparatus and used integrally with the disc drive apparatus, the electronic appliance comprising:
   an apparatus main body;
   a containing section containing the disc drive apparatus;
   an appliance main body having a first see-through section configured to expose a containing section to an outside and the apparatus main body is provided in the appliance main body;
   a disc receiving section configured to receive a disc-shaped recording medium;
   a disc rotary drive mechanism configured to drive the disc-shaped recording medium to rotate;
   a recording and/or reproduction mechanism configured to record information signals on and/or reproduce information signals from the disc-shaped recording medium; and
   a disc tray containing the disc receiving section, the disc rotary drive, and the recording and/or reproduction mechanism, the disc tray being movable between an inside and an outside of the apparatus main body, wherein
   the apparatus main body is arranged in correspondence to the first see-through section formed in the appliance main body and is provided with a second see-through section exposing part of the disc-shaped recording medium placed on the disc receiving section to an outside of the appliance main body by way of the first see-through section when the disc tray is positioned in the inside of the apparatus main body.

5. The electronic appliance according to claim 4, wherein the second see-through section has a sloped surface formed at least in an outer peripheral section thereof located downstream in a rotary direction of the disc-shaped recording medium so as to be exposed to an inner surface side from an outer surface side of the apparatus main body.

6. The appliance according to claim 4, wherein a cover is provided with an anti-static-electricity material.

* * * * *